United States Patent [19]

Shanbhag et al.

[11] 4,143,164

[45] Mar. 6, 1979

[54] BACON ANALOG AND PROCESS

[75] Inventors: Sudhakar P. Shanbhag, Yorktown Heights; Shun Ku; Jackie R. Epps, both of Peekskill; Herbert T. Kempkes, Pleasantville, all of N.Y.

[73] Assignee: General Foods Corporation, White Plains, N.Y.

[21] Appl. No.: 755,537

[22] Filed: Dec. 30, 1976

[51] Int. Cl.$^2$ .......................... A23D 5/00; A23J 3/00
[52] U.S. Cl. .................................. 426/104; 426/574; 426/602; 426/613; 426/657; 426/802
[58] Field of Search ................... 426/89, 92, 104, 574, 426/576, 583, 602, 613, 656, 657, 486, 802

[56] References Cited

U.S. PATENT DOCUMENTS

| | | | |
|---|---|---|---|
| 3,108,873 | 10/1963 | Durst | 426/656 X |
| 3,434,843 | 3/1969 | Durst | 426/602 |
| 3,851,083 | 11/1974 | Brooking et al. | 426/613 |
| 3,919,435 | 11/1975 | Feldbrugge | 426/574 |
| 3,930,033 | 12/1975 | Corliss et al. | 426/103 |
| 3,999,474 | 12/1976 | Sienkiewiez et al. | 99/467 |

FOREIGN PATENT DOCUMENTS

881,397 11/1961 United Kingdom .................... 426/574

*Primary Examiner*—Robert A. Yoncoskie
*Attorney, Agent, or Firm*—Thaddius J. Carvis; Daniel J. Donovan; Mitchell E. Alter

[57] ABSTRACT

Disclosed is an improved bacon analog and a process for preparing it. The bacon analog comprises: (1) a fat phase based on a heat coagulable component selected from the group consisting of egg albumen, blood albumin and combinations of these, a water-soluble, film-forming component such as gelatin, and a fat component; and (2) a lean phase based on a loose oil-in-water dispersion of a heat coagulable protein component such as egg albumen and a fat component which comprises a blend of palm oil with a partially hydrogenated soy bean oil. The lean phase, due to the oil blend, the loose dispersion and deaeration, when used with the particular fat phase formulation, has a chewy texture much like natural bacon. Moreover, the product responds to frying by browning and crinkling much like natural bacon. The novel process calls for deaerating the lean phase, and dry blending the gelatin with the other fat phase dry components prior to adding water in preparing the fat phase.

8 Claims, No Drawings

BACON ANALOG AND PROCESS

BACKGROUND OF THE INVENTION

The present invention relates to an improved bacon analog and an improved process for preparing it.

The art has made considerable progress in recent years in the production of textured protein products which simulate natural bacon. For example, a product based on U.S. Pat. No. 3,320,070 to Hartman reached to degree of refinement necessary to introduce it commercially. This product was based on man-made fibers bound together in zones simulating the appearance of the lean and fat portions of natural bacon.

More recent efforts, both of which have also provided the basis of commercial products, are seen in U.S. Pat. No. 3,840,677 to Leidy et al and U.S. Pat. No. 3,930,033 to Corliss et al. In Leidy et al, there is disclosed a simulated, multiphased, meat-like product having distinct regions simulating natural red meat and fat. In one specific embodiment, a bacon analog is disclosed having a fat simulating portion prepared from an aqueous emulsion of fat as the discontinuous phase surrounded by a matrix of heat coagulable protein, containing such proteins as egg albumin, proteinaceous filler materials, soy isolate and other heat settable proteins.

Corliss et al describe a simulated bacon product produced by forming and stacking alternate red and white vegetable protein containing layers to simulate lean meat and fat and then cooking the stacked layers to form a slab. The individual layers are produced from separate aqueous mixtures containing specified amounts of vegetable protein fiber, egg albumin, tapioca starch, water, vegetable oil, vegetable gum such as carrageenan, vegetable protein isolate, dextrose, sodium caseinate, colorings, flavors and seasonings. These materials are mixed in an aerating type mixer until the mixture is fully homgenized and a substantial amount of air is entrapped within the matrix. This formation, as with that of Leidy et al, does not provide a juicy, smooth meltdown simulating that of natural bacon fat, or a chewy meat-like portion, but has a more dry and cracker-like texture. The materials of the type disclosed by Corliss et al and Leidy et al, however, make a rather significant improvement over the earlier products.

In a pending U.S. patent application Ser. No. 622,272, filed Oct. 10, 1975, there is disclosed a fully cooked bacon analog which has the ability to remain crisp in the presence of moisture longer than natural bacon or known commercial bacon analog products. It achieves this property in part through a high solids content in the overall product and the white phase in particular, and in part because the red or meaty phase is deaerated. This material becomes crispy soon after frying, does not have a chewy red portion and does not have a juicy, meltable fat portion.

In another recent U.S. patent application, Ser. No. 395,793, filed Sept. 10, 1973 now U.S. Pat. No. 3,999,474, by Sienkiewicz et al, there is disclosed a method and apparatus for preparing meat analogs of the type described in the above Leidy et al patent. Therein it is disclosed that in that system, the obtainment of densities above 1.05 g/cc in the red phase gives a more meaty, chewy texture; however, deaeration is not disclosed and densities of 1.08 or above have not been accomplished practicing the invention as set forth in that application.

Despite these recent advances, there remains a present need for an improved bacon analog wherein the fat and meat portions individually and in concert more nearly resemble their natural counterparts.

SUMMARY OF THE INVENTION

It is therefore an object of the present invention to provide a bacon analog having a chewier, more meat-like red portion and an overall bacon-like response to frying, texture and mouthfeel.

It is a further object of the present invention to provide an improved process for preparing a bacon analog.

These and other objects are accomplished according to the present invention which provides an improved bacon analog comprising at least two regions wherein: at least one region is a lean phase which when cooked texturally resembles the lean region of cooked natural bacon and comprises a loose oil-in-water dispersion of a heat coagulable protein, a fat blend comprising palm oil and partially hydrogenated soy bean oil, and wherein said lean phase has a density greater than about 1.08 grams per cubic centimeter; and at least one region is a fat phase which when cooked texturally resembles the fat portion of cooked natural bacon and which comprises a dispersed fat encapsulated within a continuous matrix comprising gelatin and a heat coagulable protein component selected from the group consisting of egg albumen, blood albumin and combinations of these.

The improved process of the invention comprises: (1) preparing a fat phase precursor which when cooked will simulate the fat portion of cooked natural bacon, by (a) blending dry gelatin with a dry heat-coagulable protein, selected from the group consisting of egg albumen, blood albumin, and combinations of these, (b) mixing the dry ingredients with water to form an aqueous matrix former, and (c) mixing the aqueous matrix former with fat to disperse the fat throughout the aqueous matrix former; (2) preparing a lean phase precursor which when cooked texturally resembles the lean region of cooked natural bacon by (a) mixing water with a heat coagulable protein to form an aqueous lean phase mixture, (b) mixing the aqueous lean phase mixture with a liquid blend of palm oil and partially hydrogenated soy bean oil to form a loose oil-in-water lean phase dispersion, (c) deaerating the lean phase dispersion to a density of at least 1.08 grams per cubic centimeter; (3) applying at least one layer of the fat phase precursor and at least one layer of the lean phase precursor surface to form a layered mass; and (4) subjecting the layered mass to a temperature and for a time effective to coagulate the protein in the precursors and form a unitary cohesive mass.

DETAILED DESCRIPTION OF THE INVENTION

The present invention provides an improved bacon analog product and process which can be run continuously on apparatus of the kind disclosed by Sienkiewicz et al in U.S. Pat. No. 3,999,474. The disclosure of that patent is therefore incorporated herein by reference to show a suitable apparatus and process for using it to accomplish the objects of this invention. The modifications necessary to that apparatus and process to carry out the objects of this invention will become apparent to those skilled in the art upon a reading of this detailed description, especially when viewed in light of the specific example presented herein.

A more meaty lean phase and a better overall product is obtained according to the present invention by virtue of the specific oil blend employed in the red phase, especially when the red phase is prepared as a loose oil-in-water dispersion having a density of greater than about 1.08 grams per cubic centimeter, and when this red phase is employed with a specifically formulated and prepared white or fat phase simulating portion which contains fat dispersed within a matrix comprised of a heat coagulable protein and gelatin. These improved properties are obtained by virtue of the novel process of this invention which calls for the deaeration of the red phase to attain the desired density and also calls for the unexpectedly effective step of mixing the dry gelatin with the other dry ingredients in the formation of the white phase. Outside of these changes, the disclosure of the process and product described in the above-identified Sienkiewicz et al patent application remain effective in producing products according to this invention.

In the preparation of the bacon analog, fat phase and lean phase precursors are first formed and are then layered and heat set to obtain a slab of material which can then be sliced and fried or otherwise cooked to obtain a product which realistically simulates natural bacon. It is possible to market the product of the present invention as it is produced at any processing stage after heat setting. Thus, it can be sold in slab form, sliced but not fried, partially fried, or fully fried. For simplicity in the following discussion, a product partially fried to a moisture content of about 20 to about 25% will be described. The other variations will be apparent to those skilled in the art and fall within the scope of the present invention.

In the preparation of the fat phase which when cooked resembles the textural characteristics of the fatty region of cooked natural bacon, the gelatin and heat coagulable protein, and if desired any further dry components in the mixture are dry blended and then mixed with water to form an aqueous matrix former. This aqueous matrix former is then mixed with the fat to disperse the fat throughout the aqueous matrix former. It will be understood that the specific formulation for the fat phase, while important to the overall textural properties of the bacon analog herein described, as well as its contribution to the chewiness of the red phase, does not in itself form a part of this invention but in fact falls within the scope of the invention disclosed in concurrently filed U.S. patent application Ser. No. 755,538 filed in the names of Kim and Lugay. The disclosure of that application is incorporated by reference herein.

The juiciness, melt, and mouthfeel of the fat phase is related to, among other things, its fat content. According to the preferred embodiment of this invention, the fat is one which is liquid at room temperatures and which will remain liquid even after the cooked bacon cools. Those fats and oils which solidify at room temperature and do not melt in the mouth upon eating present a waxy, undesirable coating in the mouth. The preferred fats are those which melt below 40° C. and preferably below 25° C. While natural rendered animal fats can be employed it is preferred to utilize vegetable oils such as corn oil, soy bean oil, olive oil, etc. This listing of oils is by no means exhaustive, but it is exemplary of the materials which may be employed by those skilled in the art. The particular fat is limited only to the use of fats which have the proper melting characteristics and which do not adversely affect the other physical characteristics of the product.

This fat is preferably added to the aqueous matrix former at a level of from about 30 to about 60% based upon the weight of the fat phase. In the most preferred embodiments it will be employed at a level of from about 40 to 55%.

The preferred palm oil has the following properties:
Color: 4.01 Max. (Corribond)
Free Fatty Acid: 0.05% Max.
Iodine Value: 50–56
Melting Point: 104° F.
A.O.M. Stability: 40 hours The preferred partially hydrogenated soybean oil is a winterized light amber colored lightly hydrogenated oil having the following properties:
Color: 1.5 – 15.4 Max.
FFA, %: 0.05 Max.
AOM, Hours: 20 Minimum
Cold Test, Hours: 5½ Minimum
Iodine Value: 106 – 112
P/S Ratio: 2.0
Sup. No.: 188 – 198
BHA: 430

Reasonable variations from these standards can of course be employed consistant with retention of the improved properties of the lean phase of this invention.

According to the preferred procedure for preparing the aqueous maxtrix former, a highly functional heat coagulable protein such as egg albumen, blood albumin, or combinations of these in dry form, is dry mixed with gelatin and this dry mix is then dispersed in water. The heat coagulable protein is employed at a level of from about 4 to about 18% based upon the weight of the fat phase and the gelatin is employed at a level of at least about 2% of this phase. The remaining proportion of the fat phase can be water, filler materials and flavorings. Preferably, the heat coagulable protein material comprises egg albumen, blood albumin or a combination of these and is employed at a level of from about 6 to about 14% based on the weight of the fat phase, and the gelatin is preferably employed at a level of from about 2 to about 6% by weight of the phase. By using this preferred fat system and the lean system described, a highly desirable crinkle upon frying the product is achieved.

The gelatin because of its water solublility, and its ability to form a heat meltable gel provides a smooth melting characteristic to the final fried product. Moreover, it has good film forming properties which aid in processing and stabilizing the dispersion of fat prior to heat setting of the coagulable protein. Various types of gelatin can be employed including type A, type B, and mixtures of type A and B. Also a wide range of bloom values for the gelatin can be employed. Preferably, however, the bloom values should fall within the range of from about 150 to about 300. The most preferred bloom values are those between 220 and 280.

It is possible to substitute a number of water soluble film forming materials for the gelatin so long as the gelatin still remains within the formulation at a level of at least 1% based on the weight of the fat phase. Thus, materials like carrageenan, milk whey protein, soluble caseinate salts, and partially gelatinized collagen can be employed as partial replacements with good results and materials such as caseinate hydrolysate, methylcellulose and hydroxypropylcellulose can be also employed as partial replacements with somewhat more limited effectiveness. According to a preferred embodiment of this invention, the gelatin is employed at a level of about 2% and whey protein concentrate is employed at a level of about 1.1% based on the weight of the phase. The whey protein concentrate provides a built-in cooking indicator as well as nutrition to bring the bacon analog even closer to the natural material which it is intended to simulate.

Various starches, dextrins, and dextrans can be employed to replace a portion of the heat coagulable protein component so long as the protein material itself is not reduced to a level below about 3% by weight of the fat phase. The highly functional proteins such as egg albumen and blood albumin cannot be wholly replaced with the starch because the low heat setting properties of the starches and other carbohydrates could not by themselves sustain the structural intetrity of the matrix phase. Partial replacement does, however, give acceptable texture, good oil release, smooth mouthfeel, and natural fat like melt upon mastication. Among the suitable starches are tapioca starch, amioca starch, potato starch, high amylose starch, and the like.

The fat and the aqueous matrix former should be mixed only to the extent necessary to fully disperse the fat. Mixing should not be so vigorous so as to either aerate the white phase below a density of about 0.85 grams per cubic centimeter or so much that the fat is broken up into globules having an average size of substantially less than 10 microns. Both the reduced density and reduced fat particle size will detrimentally affect final product characteristics.

It is of course possible to include various flavoring, nutritional, and texturizing materials into this fat phase as it known in the art. The only precaution to be taken here is that they not be employed in such chemical or physical forms or in such amounts that they adversely affect the final product.

In preparing the lean phase according to the present invention, the only variations over the process described in the above-identified Sienkiewicz et al patent are the use of a particular fat blend, the use of a lower shear during mixing to provide a loose oil-in-water dispersion, and the positive step of deaeration prior to heat setting. It has been unexpectedly found that the use of a blend of palm oil and hydrogenated soy bean oil in the lean phase will significantly increase the chewiness of this phase and make it more nearly resemble natural cooked lean bacon, especially when the dispersion is not made with oil droplets below about 3 to 5 microns in average diameter. The dispersion should be only stable enough to survive further processing and should not be stable, having fat particle sizes below 2 microns. Similarly, when the positive step of deaeration is employed, the lean material is even further improved with regard to a simulation of the chewy texture of natural cooked bacon. These improvements in chewiness are, however, lost where the fat phase disclosed by Sienkiewicz et al is employed as disclosed therein, but are prominant when employed in combination with a fat phase of the type described above.

The improvement by virtue of the use of the oil blend will be obtained where the ratio of the palm oil to the hydrogenated soy bean oil falls between 1:3 and 3:1. Preferably, a ratio of about 4:5 is preferred.

The lean phase necessarily employs a heat coagulable protein such as blood albumin or egg albumen, the fat blend, and water. Typical ranges of inclusion for these materials based on the weight of the lean phase are: water from 35–55%, preferably 40–50%; heat coagulable protein from 5–15%, preferably 6–10%; and fat blend from 10–25%, preferably from 15–20%. Also preferably included, however, will be protein isolate such as soy, a finely divided texturized protein and a coloring, flavoring and spices.

In preparing the lean phase precursor, the dry ingredients are preferably dry blended, then mixed with the water and aqueous ingredients to form an aqueous lean phase mixture. The aqueous lean phase mixture is then mixed with the fat blend in liquid state sufficiently to form a loose oil-in-water lean phase dispersion, e.g. fat droplet diameters above 3 and preferably above 5 microns. The lean phase dispersion is then subjected to a partial vacuum to remove entrapped air and increase the density to at least 1.08, and preferably greater than 1.10 grams per cubic centimeter. The resulting lean phase precursor is then layered and heat set according to known technology.

Typically, at least one layer of the fat phase precursor is applied with at least one layer of the lean phase precursor to a surface and subjected to heat for a time and at a temperature effective to coagulate the layered mass into a cohesive unitary mass. Preferably, at least two layers of the lean phase precursor are layered alternately with at least two layers of the fat phase precursor. The heat coagulated mass is sliced to reveal these layers as bands of fat and lean meat as they appear in natural bacon.

Then, according to the preferred embodiment, the slices are subjected to a dehydrating heat to reduce the moisture content to from 10 to 25%, preferably from 20 to 25%. A suitable device for accomplishing this is a gas fired oven capable of heating to a temperature of from about 300° F. to 400° F. This partially fried product is then frozen and distributed in frozen condition to promote long shelf life without preservatives.

The following example is presented for the purpose of further illustrating and explaining the present invention, and is not to be taken as limiting in any regard. Unless otherwise indicated, all parts and percentages are by weight.

EXAMPLE

A bacon analog product according to the present invention is prepared from the following formulation:

| Ingredients | Lean Phase Precursor (%) | Fat Phase Precursor (%) |
|---|---|---|
| Water | 45.5 | 23.6 |
| Durkex 25 partially hydrogenated soybean oil | 10.1 | 47.2 |
| Palm oil | 8.2 | — |
| Promine DS soy protein isolate | 13.7 | — |
| Textured vegetable protein | 4.6 | — |
| Dried egg albumen | 7.4 | 12.7 |
| Gelatin - Type B (250 bloom) | — | 2.0 |
| Empro 50 whey protein concentrate | — | 1.1 |
| Flavor & color | 10.5 | 13.4 |

To prepare the lean phase precursor, the dry ingredients are first mixed in a Hobart mixer for 10 minutes at speed 1. To this dry mix, the water and color solution are added and mixed at 75° F. on speed 2 for 20 minutes. The soybean oil, palm oil and bacon flavor are then added. The soybean oil is at a temperature of 75° F. and mixed with the bacon flavor, and the palm oil is at a temperature of 100° F., prior to addition. The combined mix is then mixed on speed 1 for 15 minutes to obtain a loose oil-in-water dispersion. This resulting lean phase dispersion is then transferred to a sigma blade mixer and subjected to a reduced pressure of 29 inches of Hg for 5 minutes to complete the preparation of the lean phase precursor. The density of this precursor is 1.11 g/cc and shows a viscosity of 21 Brookfield units at 5 rpm at 72° F. using a T-B spindle mounted on a helipath.

To prepare the fat phase precursor, the dry ingredients are first dry mixed in a Hobart mixer at speed 1 for 10 minutes. The water is heated to 120° F. and slowly added while mixing on speed 1 for an additional 15 minutes. The oil is heated to 100° F., mixed with the bacon flavor and added slowly while mixing on speed 1 for an additional 10 minutes. The resulting fat phase precursor has a density of 0.95 g/cc and a viscosity of 20 Brookfield units at 5 rpm at 72° F. using a T-B spindle mounted on a helipath.

A layered product is prepared by layering six alternate portions (three each) of the lean and fat phase precursors, to obtain a weight ratio of lean to fat phases of 60:40, and heat setting the layered mass in an atmosphere having a wet bulb temperature of 206° F. and a dry bulb temperature of 270° F. for 30 minutes. The resulting cohesive layered mass is then allowed to cool to room temperature and refrigerated overnight to temper. The tempered mass is then sliced to a thickness of 0.062 inches and subjected to electrically heated infrared heat in a Radiant Process Heater for 90 seconds to reduce the moisture content to 23%. The product is then frozen for shipment and storage. The product is prepared for eating by frying for about 5-8 minutes in a small amount of oil at 350° F. to a golden brown color and a moisture of about 3.5%. The completion of frying is indicated by a browning of the fat phase similar to natural bacon.

Having thus described our invention fully and concisely, we note that many modifications and variations thereof will become apparent to those skilled in the art upon reading our disclosure. Accordingly, we do not wish to be limited to those embodiments specifically set out for the purpose of conciseness, but intend that all such modifications and variations thereof which are apparent to those of ordinary skill in the art be included within the scope of our invention which is defined by the following claims.

What is claimed is:

1. A bacon analog comprising at least two regions forming a unitary layered mass wherein: at least one region is a lean phase which when cooked texturally resembles the lean region of cooked natural bacon and comprises a loose oil-in-water dispersion of from 6% to 15% based on the weight of the phase of heat coagulable protein and from 10% to 25% of a fat blend comprising palm oil and partially hydrogenated soy bean oil at a ratio of palm oil to soy bean oil within the range of 3:1 to 1:3, and wherein said lean phase has a density greater than about 1.08 grams per cubic centimeter; and at least one region is a fat phase which when cooked texturally resembles the fat portion of cooked natural bacon and comprises from 30% to 60% fat having a melting point below 40° C., said percentages being based on the weight of the phase, dispersed within a continuous matrix comprising at least 1% gelatin based on the weight of the fat phase and at least 3% based on the weight of the fat phase of a heat coagulable protein component selected from the group consisting of egg albumin, blood albumin, and combinations of these.

2. An improved bacon analog according to claim 1 wherein the density of the lean phase is greater than 1.10 grams per cubic centimeter.

3. An improved bacon analog according to claim 2 wherein the gelatin employed in the fat phase is present at a level of at least 2% based on the total weight of the fat phase and the fat phase also contains milk whey protein concentrate at a level of about 1.1% as a cooking indicator.

4. An improved bacon analog according to claim 3 wherein the heat coagulable protein employed in the lean phase is comprised of egg albumen, blood albumin, or combinations of these, and wherein in the fat phase said protein is present at a level of at least 8%.

5. A process for preparing a bacon analog which comprises:
 (1) preparing a fat phase precursor which when cooked will simulate the fat portion of cooked natural bacon, by
  (a) blending at least 1% dry gelatin based on the total weight of the fat phase with at least 3% based on the weight of the fat phase of a dry heat-coagulable protein, selected from the group consisting of egg albumen, blood albumin, and combinations of these,
  (b) mixing the dry ingredients with water to form an aqueous matrix former, and
  (c) mixing the aquous matrix former with from 30 to 60% fat having a melting point below 40° C. based on the weight of the phase to disperse the fat throughout the aqueous matrix former;
 (2) preparing a lean phase precursor which when cooked texturally resembles the lean region of cooked natural bacon by
  (a) mixing water with from 6% to 15% based on the weight of the phase of heat coagulable protein to form an aqueous lean phase mixture,
  (b) mixing the aqueous lean phase mixture with from 10% to 25% of a liquid blend of palm oil and partially hydrogenated soybean oil, the palm and soybean oils being present at a ratio within the range from 1:3 to 3:1, to form a loose oil-in-water lean phase dispersion,
  (c) deaerating the lean phase dispersion to a density of at least 1.08 grams per cubic centimeter;
 (3) applying at least one layer of the fat phase precursor and at least one layer of the lean phase precursor to a surface to form a layered mass; and
 (4) subjecting the layered mass to a temperature and for a time effective to coagulate the protein in the precursors and form a unitary cohesive mass.

6. An improved process according to claim 5 wherein the density of the lean phase is greater than about 1.10 grams per cubic centimeter.

7. An improved process according to claim 6 wherein the heat coagulable protein employed in the lean phase is comprised of egg albumen, blood albumin, or combinations of these, and wherein in the fat phase said protein is employed at a level of at least 8%.

8. An improved process according to claim 7 wherein the gelatin employed in the fat phase is present at a level of at least 2% based on the total weight of the fat phase, and the fat phase further includes milk whey protein concentrate at a level of about 1.1%.

* * * * *